United States Patent
Lee et al.

(10) Patent No.: US 9,906,276 B2
(45) Date of Patent: Feb. 27, 2018

(54) METHOD AND APPARATUS FOR NEAR FIELD COMMUNICATION

(71) Applicant: Electronics and Telecommunications Research Institute, Daejeon (KR)

(72) Inventors: Seok-jin Lee, Daegu (KR); Moon-Sik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 14/632,293

(22) Filed: Feb. 26, 2015

(65) Prior Publication Data

US 2015/0244428 A1    Aug. 27, 2015

(30) Foreign Application Priority Data

Feb. 26, 2014   (KR) .................. 10-2014-0022612
Jan. 26, 2015   (KR) .................. 10-2015-0012382

(51) Int. Cl.
*H04B 5/00*   (2006.01)
*H04B 5/02*   (2006.01)

(52) U.S. Cl.
CPC ......... *H04B 5/0062* (2013.01); *H04B 5/0031* (2013.01); *H04B 5/02* (2013.01)

(58) Field of Classification Search
CPC ....... H04B 5/0062; H04B 5/0031; H04B 5/02
USPC ..................................................... 455/41.1
See application file for complete search history.

(56) References Cited

U.S. PATENT DOCUMENTS

| | | | |
|---|---|---|---|
| 8,458,483 B1 * | 6/2013 | Bailey | G06F 21/35 340/10.1 |
| 8,674,808 B2 * | 3/2014 | Jantunen | G06K 7/0008 235/375 |
| 8,850,196 B2 * | 9/2014 | Blanco | H04L 63/0492 380/270 |
| 9,124,312 B2 * | 9/2015 | Hatakeyama | H04B 5/0056 |
| 9,520,638 B2 * | 12/2016 | Baringer | H01Q 21/28 |
| 2009/0195360 A1 * | 8/2009 | Jeon | H04B 5/0062 340/10.1 |
| 2010/0328043 A1 * | 12/2010 | Jantunen | G06K 7/0008 340/10.3 |
| 2010/0328047 A1 * | 12/2010 | Jantunen | G06K 7/0008 340/10.4 |
| 2011/0028091 A1 * | 2/2011 | Higgins | H04L 63/0492 455/41.2 |

(Continued)

FOREIGN PATENT DOCUMENTS

KR   1020090084291 A   8/2009
KR   1020100076440 A   7/2010

(Continued)

*Primary Examiner* — April G Gonzales
(74) *Attorney, Agent, or Firm* — William Park & Associates Ltd.

(57) ABSTRACT

A method and apparatus for near field communication (NFC) are provided. A reader searches for communication with another party according to a first communication method of transmitting a communication request signal or a reader searches for communication with another party according to a second communication method of performing wireless power transmission. When the reader receives a response signal from communication with another party, the reader performs communication with the other party.

12 Claims, 10 Drawing Sheets

(a)

(b)

(56) References Cited

U.S. PATENT DOCUMENTS

| | | | |
|---|---|---|---|
| 2011/0059692 A1* | 3/2011 | Hyoung | H04B 5/0037 455/41.1 |
| 2011/0294428 A1* | 12/2011 | Hatakeyama | H04B 5/0056 455/41.2 |
| 2012/0092137 A1* | 4/2012 | Buscemi | G06K 7/10297 340/10.51 |
| 2013/0234829 A1* | 9/2013 | Jeon | H04B 5/0062 340/10.1 |
| 2014/0306798 A1* | 10/2014 | Jeon | H04B 5/0062 340/5.61 |
| 2014/0315485 A1* | 10/2014 | Marie | H04L 63/0428 455/41.1 |

FOREIGN PATENT DOCUMENTS

| | | |
|---|---|---|
| KR | 1020130039158 A | 4/2013 |
| KR | 1020130117039 A | 10/2013 |

\* cited by examiner (a)

(b)

METHOD AND APPARATUS FOR NEAR FIELD COMMUNICATION

CROSS-REFERENCE TO RELATED APPLICATION

This application claims priority to and the benefit of Korean Patent Application No. 10-2014-0022612 and No. 10-2015-0012382 filed in the Korean Intellectual Property Office on Feb. 26, 2014 and Jan. 26, 2015, the entire contents of which are incorporated herein by reference.

BACKGROUND OF THE INVENTION (a) Field of the Invention

The present invention relates to a method and apparatus for near field communication (NFC) that can transmit at a high speed.

(b) Description of the Related Art

Near field communication (NFC) is technology that transmits data with low power within a predetermined distance (e.g., 10 cm) based on radio frequency identification (RFID) using a frequency of, for example, the 13.56 MHz band. For example, in NFC, data is transmitted with a speed of about 424 kbps.

When using NFC technology, by a method of approaching devices that support at least two NFC technologies even without a user's artificial manipulation or complex procedure, bi-directional communication is possible. Particularly, a device that supports NFC, i.e., an NFC device, is wireless communication that transfers mutual information based on wireless power transmission through a magnetic field and backscattering of the magnetic field. The method enables wireless communication between a reader and a tag while supplying power to a non-powered tag having no power source.

However, a backscattering signal using in this technology is weak and thus it is difficult to make a transmission speed thereof high.

As a demand for a large amount of multimedia increases, a demand for transmission of wireless packets at a near distance increases. Due to such a use environment, necessity for transmission of a large number of wireless packets using a reader instead of a tag as communication with another party of an NFC reader increases. Wireless transmission technology used in existing NFC has a slow communication speed when used for wireless transmission of a large number of files. Particularly, when applying communication between an NFC reader and a reader, there is a problem that the wireless transmission technology is inconvenient due to a slow transmission speed. For example, when transmitting a large number of files in a near distance, until transmission is complete, a user mostly holds a device and waits. In this case, in order to shorten the waiting time, high speed transmission should be performed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for NFC having advantages of being capable of transmitting at a high speed.

An exemplary embodiment of the present invention provides a communication method in an NFC environment, including: searching for, by a reader, communication with another party according to a first communication method of transmitting a communication request signal; searching for, by the reader, communication with another party according to a second communication method of performing wireless power transmission; and performing, when the reader receives a response signal from communication with another party, communication with the other party.

The searching for communication with another party according to a second communication method of performing wireless power transmission may be performed after performing the searching for communication with another party according to a first communication method.

The searching for communication with another party according to a second communication method of performing wireless power transmission may be performed when a response signal corresponding to the communication request signal is not received from communication with another party even after a first predetermined time has elapsed, after performing the searching for communication with another party according to a first communication method.

The searching for of communication with another party according to a second communication method of performing wireless power transmission may be performed after terminating the search for communication with another party according to the first communication method of transmitting a communication request signal when a response signal corresponding to the communication request signal is not received from communication with another party even after the first predetermined time has elapsed.

The searching for of communication with another party according to a second communication method may include: performing wireless power transmission according to the second communication method; and resuming search for communication with another party according to a first communication method of transmitting the communication request signal when a second predetermined time has elapsed after performing the wireless power transmission.

The resuming of search for communication with another party may include searching for communication with another party according to the first communication method while performing the wireless power transmission.

The searching for communication with another party according to a first communication method of transmitting a communication request signal may be performed after performing the searching for communication with another party according to a second communication method of performing wireless power transmission.

The search for of communication with another party according to a first communication method of transmitting a communication request signal may be performed when a third predetermined time has elapsed, after performing the searching for communication with another party according to a second communication method.

The searching for communication with another party according to the first communication method may include searching for communication with another party according to the first communication method while performing the wireless power transmission.

The communication method may further include: searching for communication with another party according to the first communication method when the reader is in a wake-up state by a signal that is input through a user interface device; and searching for communication with another party according to the second communication method.

The searching for communication with another party according to a first communication method may include repeatedly transmitting the communication request signal through a microwave band.

Another embodiment of the present invention provides a communication apparatus that performs communication in an NFC environment, the communication apparatus including: a first transmitting and receiving unit that searches for communication with another party according to a first communication method of transmitting a communication request signal; a wireless power transmitting unit that performs wireless power transmission; and a communication controller that performs communication with the other party, when a response signal is received from the other party through the first transmitting and receiving unit.

Wireless power transmission may be performed through the wireless power transmitting unit, when a response signal corresponding to the communication request signal from communication with another party is not received even after a first predetermined time has elapsed, after a communication request signal by the first transmitting and receiving unit is transmitted. Communication request signal transmission by the first transmitting and receiving unit and wireless power transmission through the wireless power transmitting unit may be performed together.

When a response signal corresponding to a communication request signal from communication with another party is not received even after the first predetermined time has elapsed, wireless power transmission through the wireless power transmitting unit may be performed after communication request signal transmission by the first transmitting and receiving unit is terminated, and communication request signal transmission by the first transmitting and receiving unit may be resumed, when a second predetermined time has elapsed, after wireless power transmission is performed.

Communication request signal transmission by the first transmitting and receiving unit may be performed when a third predetermined time has elapsed after wireless power transmission is performed through the wireless power transmitting unit.

The communication apparatus may further include a user interface unit, wherein communication request signal transmission by the first transmitting and receiving unit or wireless power transmission through the wireless power transmitting unit may be performed when the communication apparatus is in a wake-up state by a signal that is input through the user interface unit.

Only communication request signal transmission by the first transmitting and receiving unit may be performed when the communication apparatus is in a wake-up state. The wireless power transmitting unit may include a power transfer coil.

DETAILED DESCRIPTION OF EXEMPLARY EMBODIMENTS

Figure 1:
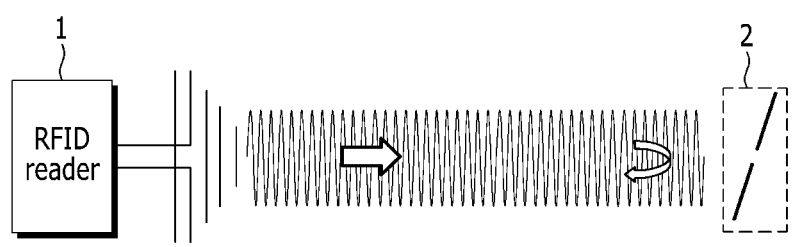
FIG. 1 is a diagram illustrating a near field communication (NFC) system.
Figure 1:
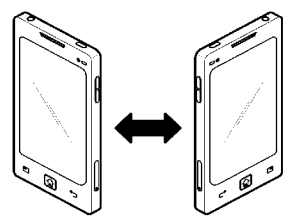

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, a method and apparatus for NFC that can transmit at a high speed according to an exemplary embodiment of the present invention will be described in detail with reference to the drawings.

FIG. 1 is a diagram illustrating an NFC system.

As shown in FIG. 1(a), for NFC, an NFC reader (e.g., a radio frequency identification (RFID) reader) 1 may load information on a change of a magnetic field in communication with another party, for example, a tag device 2, and communicate with the tag device 2.

The tag device 2 may communicate with the NFC reader 1 using a backscattering-based load modulation method, receive electromagnetic waves from the NFC reader 1, scatter the electromagnetic waves, and return the electromagnetic waves to the NFC reader 1. In this case, the tag device 2 changes a magnitude or a phase of the scattered electromagnetic waves, sends information of the tag, adjusts antenna impedance, and includes and sends information in a carrier signal that is received from the NFC reader 1.

Further, NFC between readers may be performed as shown in FIG. 1(b).

Figure 2:
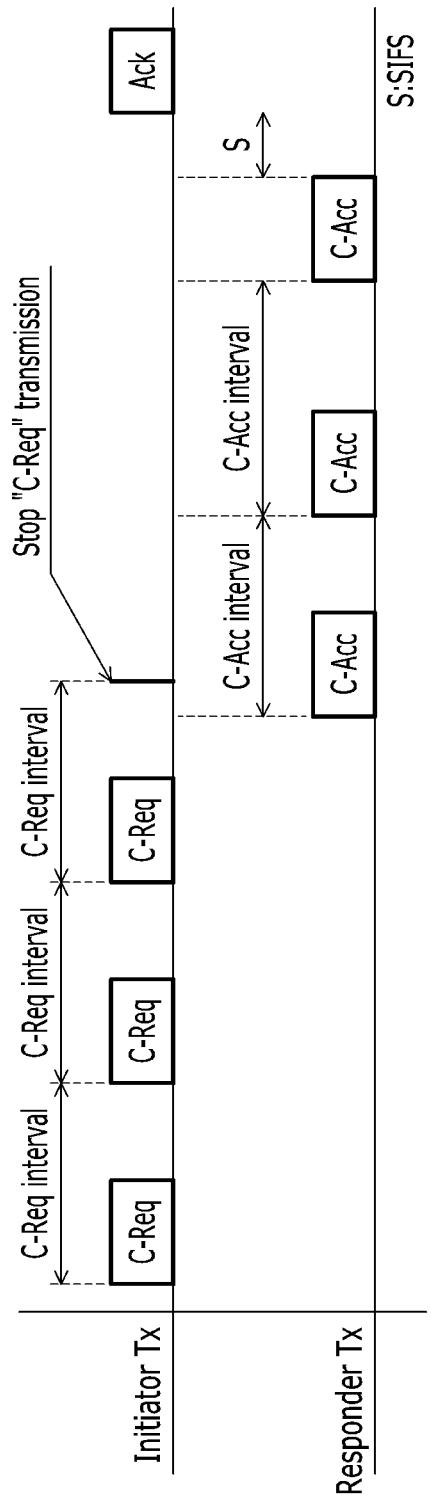
FIG. 2 is a diagram illustrating a concept of a protocol in which an NFC reader searches for communication with another party in NFC.

FIG. 2 is a diagram illustrating a concept of a protocol in which an NFC reader searches for communication with another party in NFC.

An NFC reader according to an exemplary embodiment of the present invention attempts communication with microwaves in a wake-up state (e.g., may be woken up based on a user interface (UI) such as a button manipulation of a user). As shown in FIG. 2, the NFC reader repeatedly transmits a communication request signal C-Req with a predetermined interval according to microwave communication. When a response signal C-Acc is received from communication with another party to correspond thereto, the NFC reader performs communication with the responded communication party while terminating transmission of the communication request signal C-Req.

However, even though the NFC reader repeatedly transmits a communication request signal C-Req with a predetermined interval according to microwave communication, when responding communication of another party does not exist, the NFC reader determines that a communication apparatus having a power source does not exist in a possible communication range.

In an exemplary embodiment of the present invention, in an NFC environment, for high speed transmission, a process of searching for communication with another party according to a first communication method is performed and a process of searching for communication with another party according to a second communication method is performed. In an exemplary embodiment of the present invention, an expression such as "first", "second", "third", and "primary" is not used for dividing order but is used for identifying other elements.

Figure 3:
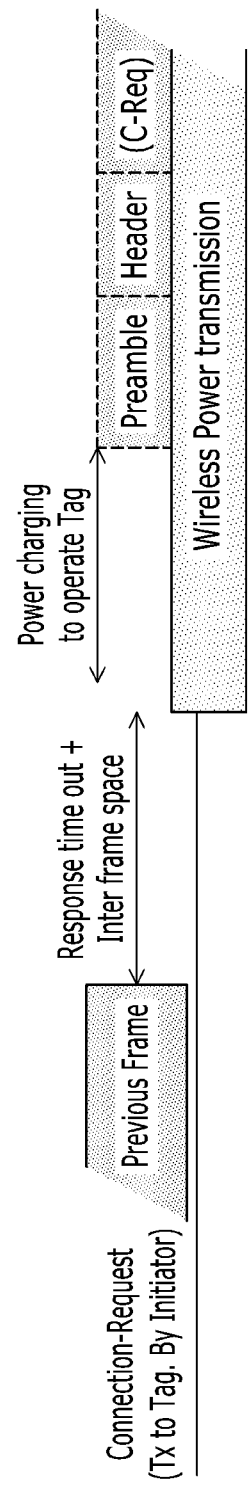
FIG. 3 is a diagram illustrating a concept of a protocol in which an NFC reader searches for communication with another party in a communication method according to an exemplary embodiment of the present invention.

FIG. 3 is a diagram illustrating a concept of a protocol in which an NFC reader searches for communication with another party in a communication method according to an exemplary embodiment of the present invention. Specifically, FIG. 3 is a schematic view illustrating search for communication with another party with a second communication method (e.g., requesting and searching for wireless communication while performing wireless power transmission) when communication is requested with a first communication method (e.g., existing wireless communication request search method), but there is no response.

Figure 4:
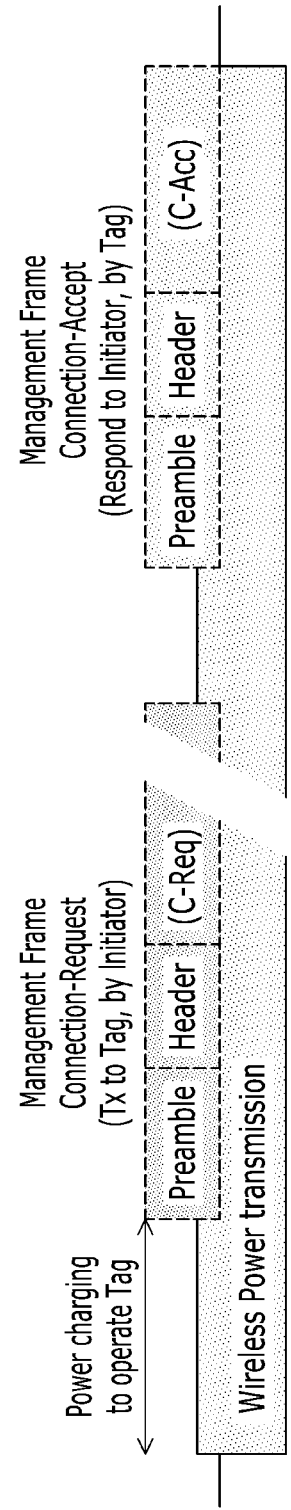
FIG. 4 is a diagram illustrating a protocol in which an NFC reader transmits and receives communication to and from another party with a communication method according to an exemplary embodiment of the present invention.

FIG. 4 is a diagram illustrating a protocol in which an NFC reader transmits and receives communication to and from another party with a communication method according to an exemplary embodiment of the present invention. Specifically, FIG. 4 is a schematic view illustrating search of communication with another party with a second communication method (e.g., requesting and searching for wireless communication while performing wireless power transmission).

In an exemplary embodiment of the present invention, a process of searching for communication with another party according to a first communication method, for example, microwave communication is performed, and a process of searching for communication with another party according to a second communication method, for example, wireless power transmission is performed. In a process of searching for communication with another party according to a first communication method, when there is no response, a process according to a second communication method may be performed. When searching for communication with another party using a second communication method, while performing magnetic field-based wireless power transmission, microwave communication is again attempted. That is, wireless power transmission is started, and thereafter, when a predetermined time (e.g., charge time) has elapsed, microwave communication is performed. A communication state search based on such a second communication method is as attempt at communication while supplying power for communication with another party through wireless power transmission. Here, microwave communication represents RF data communication for a general terminal using bands of hundreds of megahertz to bands of tens of megahertz, and wireless power transmission represents remote wireless power transfer. For example, wireless power transmission is remote wireless power transfer using a coil, and includes wireless power transfer using magnetic coupling or magnetic resonance.

As shown in FIG. 3, the NFC reader repeatedly transmits a communication request signal C-Req with a predetermined interval according to a microwave communication procedure. Thereafter, when a predetermined time (e.g., a predetermined time after a previous frame (response time lapse+ predetermined frame interval (response time out+inner frame space))) has elapsed, if a response signal is not received, the NFC reader terminates transmission of a communication request signal C-Req and performs wireless power transmission for charging communication with another party (e.g., a tag). The NFC reader retransmits a communication request signal C-Req according to microwave communication.

That is, as shown in FIG. 4, while performing wireless power transmission, the NFC reader retransmits a communication request signal C-Req according to microwave communication. Thereafter, when a response signal C-Acc is received from communication with another party, the NFC reader performs communication with the other party while terminating transmission of the communication request signal C-Req. In this case, even in a state in which communication with the other party is performed, wireless power transmission can be performed.

Figure 5:
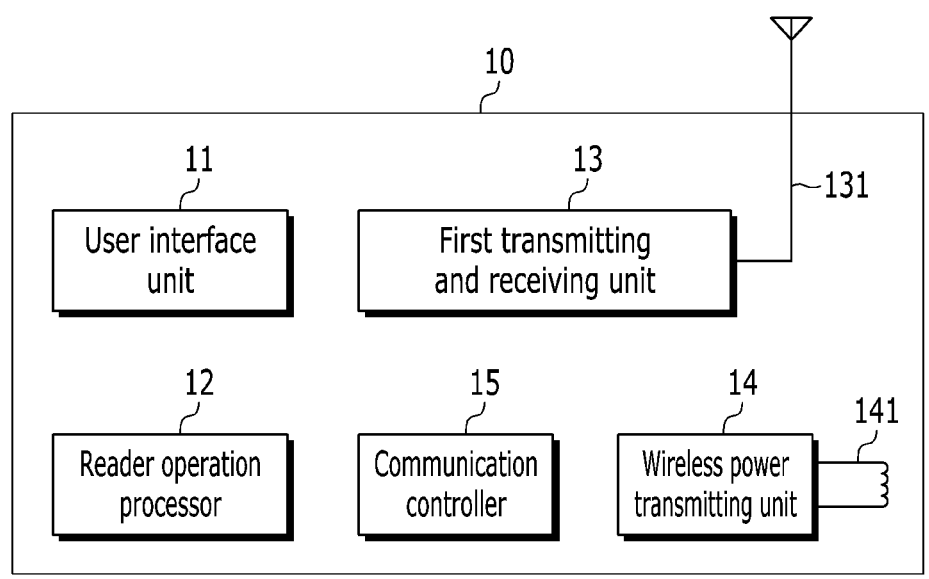
FIGS. 5 and 6 are diagrams illustrating a structure of a communication apparatus according to an exemplary embodiment of the present invention.

FIG. 5 is a diagram illustrating a structure of a communication apparatus according to an exemplary embodiment of the present invention.

As shown in FIG. 5, a communication apparatus, i.e., an NFC reader 10 according to an exemplary embodiment of the present invention includes a user interface unit 11, a reader operation processor (or referred to as an application processor) 12, a first transmitting and receiving unit 13, a wireless power transmitting unit 14, and a communication controller 15.

The user interface unit 11 performs an interface function with a user, and transfers signals that are input according to a user manipulation to the reader operation processor 12. The user interface unit 11 may include various interface devices such as a button and a keypad.

The first transmitting and receiving unit 13 performs signal transmission and reception according to a first communication method, for example, microwave communication, and for this purpose, the first transmitting and receiving unit 13 includes a transmitting and receiving antenna 131. The first transmitting and receiving unit 13 may perform signal transmission and reception of a microwave band through known technology in the art, and for this purpose, the first transmitting and receiving unit 13 may be implemented in a form including a signal amplifier, a modulator, and a demodulator. Such technology is known technology and thus a detailed description thereof will be omitted.

The wireless power transmitting unit 14 performs wireless power transmission. For this purpose, the wireless power transmitting unit 14 includes a power transport coil 141.

The communication controller 15 controls operation of the first transmitting and receiving unit 13 and the wireless power transmitting unit 14 to perform signal transmission and wireless power transmission of a microwave band according to a first communication method. Such a communication controller 15 may operate according to a signal that is transferred from the reader operation processor 16.

The reader operation processor 12 operates the NFC reader 10 in a wake-up state according to a signal that is input through the user interface unit 11 and performs a process of searching for communication with another party in a wake-up state. Specifically, by operating the first transmitting and receiving unit 13 through the communication controller 15, the reader operation processor 12 transmits a communication request signal according to microwave communication. Thereafter, after a first predetermined time has elapsed, when a response signal is not received, the reader operation processor 12 terminates a communication request signal of the first transmitting and receiving unit 13 through the communication controller 15, and by operating the wireless power transmitting unit 14 through the communication controller 15, the reader operation processor 12 performs wireless power transmission for charging communication with another party. After wireless power transmission is performed, when a second predetermined time has elapsed, the reader operation processor 12 resumes communication request signal transmission of the first transmitting and receiving unit 13 through the communication controller 15. While together performing communication request signal transmission of a microwave band by the first transmitting and receiving unit 13 and wireless power transmission by the wireless power transmitting unit 14, the reader operation processor 12 searches for communication with another party. Thereafter, when a response signal is received from communication with another party through the first transmitting and receiving unit 13, the reader operation processor 12 terminates a process of searching for communication with another party and performs communication.

Communication with another party, i.e., a tag device 20 communicating with the NFC reader 10 that is formed in such a structure, is formed in the following structure.

Figure 6:
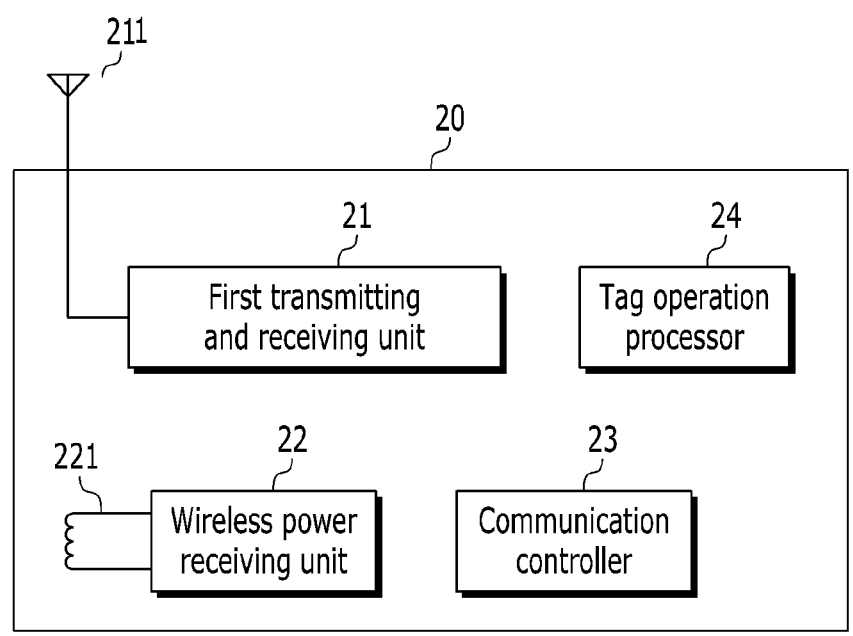

FIG. 6 is a diagram illustrating a structure of a communication apparatus according to an exemplary embodiment of the present invention.

As shown in FIG. 6, a communication apparatus, i.e., the tag device 20 according to an exemplary embodiment of the present invention, includes a first transmitting and receiving unit 21, a wireless power receiving unit 22, a communication controller 23, and a tag operation processor 24.

The first transmitting and receiving unit 21 performs signal transmission and reception according to a first communication method, for example, microwave communication, and for this purpose, the first transmitting and receiving unit 21 includes a transmitting and receiving antenna 211.

The wireless power receiving unit 22 performs wireless power reception. For this purpose, the wireless power receiving unit 22 includes a power receiving coil 221.

The communication controller 23 controls operation of the first transmitting and receiving unit 21 and the wireless power receiving unit 22 to perform signal transmission and reception of a microwave band and wireless power reception according to a first communication method. Such a communication controller 23 may operate according to a signal that is transferred from the tag operation processor 24.

When the tag device 20 operates according to wireless power that is received by the wireless power receiving unit 22, the tag operation processor 24 performs transmission and reception through the first transmitting and receiving unit 21. When a communication request signal is received through the first transmitting and receiving unit 21, the tag operation processor 24 enables a response signal to transmit through the first transmitting and receiving unit 21.

When the reader is formed in the same structure as that of FIG. 6, the reader may communicate with another reader in a form including wireless power transmission or a form that does not include wireless power transmission.

Figure 7:
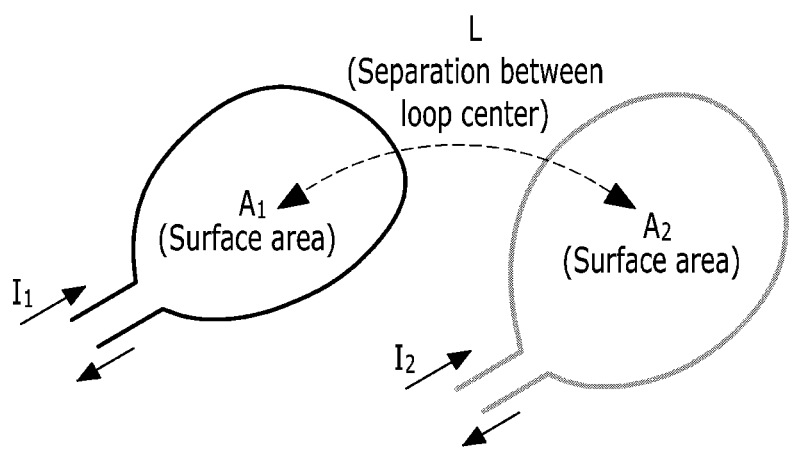
FIG. 7 is a diagram illustrating a wireless power transfer concept according to wireless power transmission of an exemplary embodiment of the present invention.

FIG. 7 is a diagram illustrating a wireless power transfer concept according to wireless power transmission of an exemplary embodiment of the present invention.

When a current $I_1$ is supplied to a coil $A_1$ according to magnetic coupling, a current $I_2$ is represented in a coil $A_2$. That is, a current $I_2$ that is transferred by wireless is represented in a coil $A_2$.

While wireless power transmission is performed between the NFC reader 10 and the tag device 20 according to an exemplary embodiment of the present invention based on such wireless power transmission, wireless power from the NFC reader 10 is transferred to the tag device 20.

Figure 8:
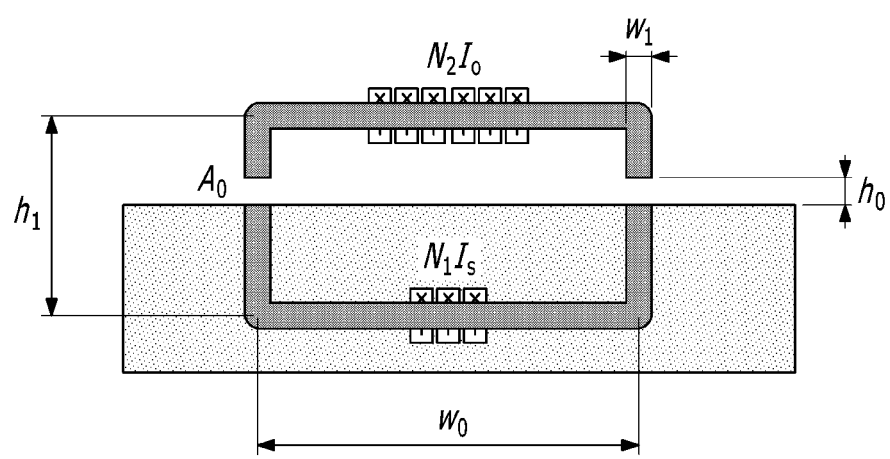
FIG. 8 is a diagram illustrating wireless power transmission between an NFC reader and a tag device according to an exemplary embodiment of the present invention.

FIG. 8 is a diagram illustrating wireless power transmission between an NFC reader and a tag device according to an exemplary embodiment of the present invention.

As shown in FIG. 8, a distance between two coils, i.e., the power transport coil 141 of the NFC reader 10 and the power receiving coil 221 of the tag device 20 for wireless power supply and wireless power reception may be a predetermined distance $h_0$.

Power transfer between the NFC reader 10 and the non-powered tag device 20 forming such a predetermined distance $h_0$ is performed based on wireless power transmission.

Power transfer may be performed in a wireless power transmission form of a magnetic resonance method between the NFC reader 10 and the non-powered tag device 20. When two mediums resonate with the same frequency, wireless power transmission of a magnetic resonance method uses an attenuation wave coupling phenomenon in which electromagnetic waves move from one medium to another medium through a short range magnetic field. Such wireless power transmission is known technology in the art and thus a detailed description thereof will be omitted.

Figure 9:
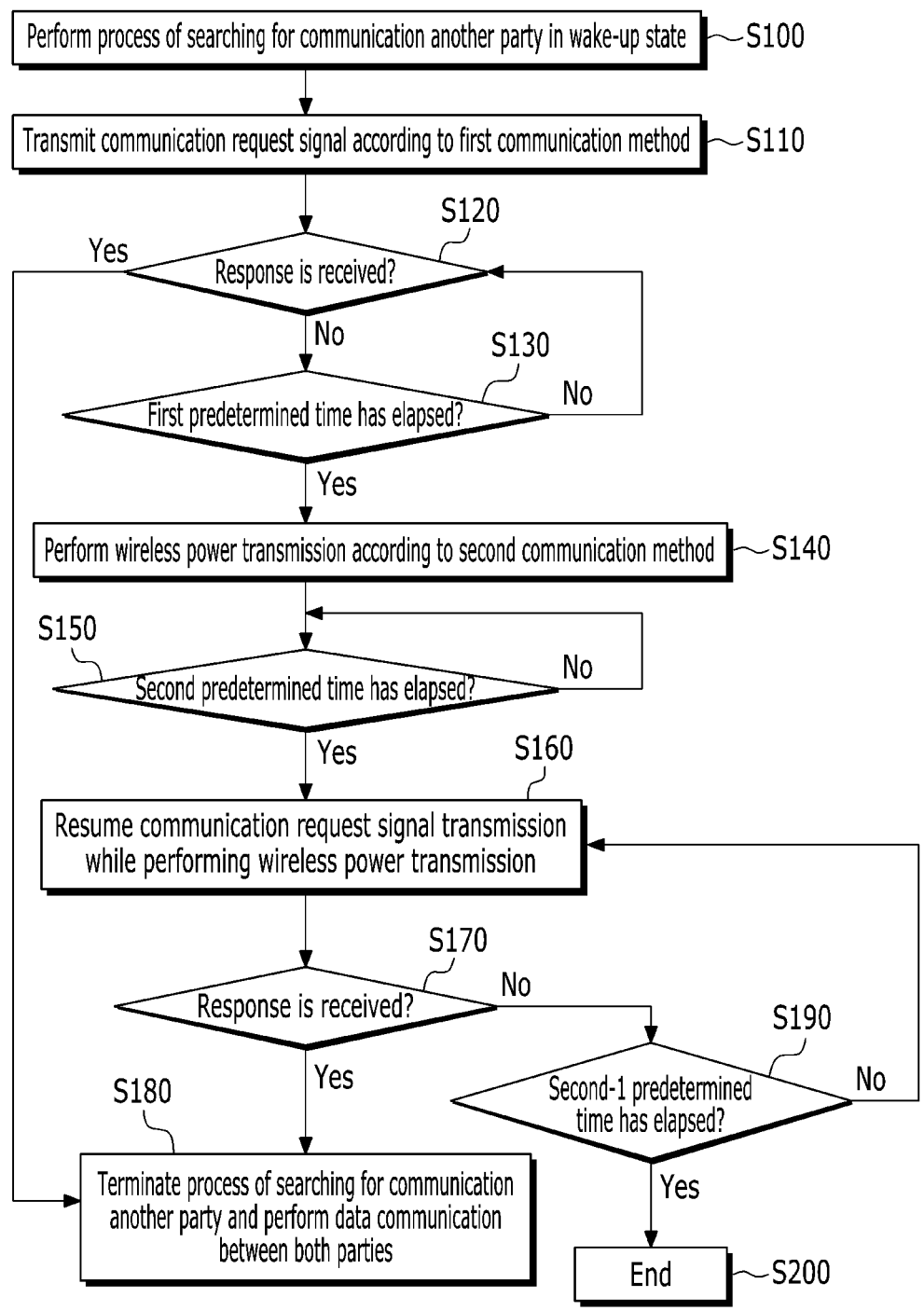
FIG. 9 is a flowchart illustrating an NFC method according to an exemplary embodiment of the present invention.

FIG. 9 is a flowchart illustrating an NFC method according to an exemplary embodiment of the present invention.

As shown in FIG. 9, the NFC reader 10 performs a process of searching for communication with another party in a wake-up state (S100). For example, when a user signal according to operation such as button pressing is input through the user interface unit 11, the NFC reader 10 wakes up by the reader operation processor 12.

In order to search for communication with another party, the NFC reader 10 performs a process of searching for communication with another party according to a first communication method. Specifically, by operating the first transmitting and receiving unit 13, the NFC reader 10 transmits a communication request signal according to microwave communication, as shown in FIG. 3. The communication request signal may be repeatedly transmitted.

The NFC reader 10 transmits a communication request signal according to a first communication method (S110) and determines whether a response to the communication request signal is received (S120), if a response to a communication request signal is not received, the NFC reader 10 determines whether a first predetermined time has elapsed (S130), and if a first predetermined time has elapsed, the NFC reader 10 terminates a process of searching for communication with another party according to a first communication method and performs a process of searching for communication with another party according to a second communication method (S140). Specifically, the NFC reader 10 terminates a communication request signal of the first transmitting and receiving unit 13 and performs wireless power transmission for charging communication with another party by operating the wireless power transmitting unit 14. Here, a first predetermined time may be a time that is counted after transmitting a communication request signal, and for example, may be a time in which a response lapse time that is counted after a frame of a final communication request signal is transmitted and a time corresponding to a frame interval are added, when a communication request signal is repeatedly transmitted.

In a process of searching for communication with another party according to a second communication method, wireless power transfer through the wireless power transmitting unit 14 is performed.

The NFC reader 10 determines whether a second predetermined time has elapsed while performing wireless power transmission (S150), and if a second predetermined time has elapsed, the NFC reader 10 resumes communication request signal transmission according to a first communication method (S160). Here, a second predetermined time may be a predetermined time that has elapsed after wireless power transmission is started or may be a charge time of a non-powered device.

The NFC reader 20 may simultaneously resume communication request signal transmission according to a first communication method while performing wireless power transmission. In this case, the second predetermined time may be "0".

As shown in FIG. 8, when the non-powered tag device 20 is located within a power transmissive distance $h_0$ according to wireless power transmission, if a current is supplied to the power transport coil 141 of the wireless power transmitting unit 14, the current that is transferred by wireless is represented in the power receiving coil 221 of the tag device 20. The non-powered tag device 20 is operated through such wireless power transmission.

The operated tag device 20 receives a communication request signal according to a first communication method, generates a response signal corresponding to the communication request signal, and transmits the response signal to the NFC reader 10, as shown in FIG. 4.

As described above, in a process of searching for communication with another party while performing both communication request signal transmission of a microwave band by the first transmitting and receiving unit 13 and wireless power transmission by the wireless power transmitting unit 14, the NFC reader 10 determines whether a response signal is received from the tag device 20 (S170), and if a response signal is received from the tag device 20, the NFC reader 10 terminates a process of searching for communication with another party and performs communication (S180). If a response signal according to communication request signal transmission of a microwave band by the first transmitting and receiving unit 13 is received based on a first communication method at step S120, the NFC reader 10 terminates a process of searching for communication with another party and performs communication (S180).

When the non-powered tag device exists within a possible communication range through such a process, wireless power transmission is performed so that the non-powered tag device communicates. Therefore, by using microwave communication instead of a backscattering method that is used in existing NFC technology, a large amount of data can be transferred at a high speed between a reader and a tag device.

If a response signal is not received from the tag device 20 at step S170, the NFC reader 10 determines whether a second-1 predetermined time has elapsed (S190), and if a second-1 predetermined time has elapsed, the NFC reader 10 terminates a search process. If a second-1 predetermined time has not elapsed, the process returns to step S160.

In the above exemplary embodiment, communication request signal transmission is performed using a microwave band according to a first communication method and wireless power transmission according to a second communication method is performed, but only microwave communication may be performed without wireless power transmission.

Figure 10:
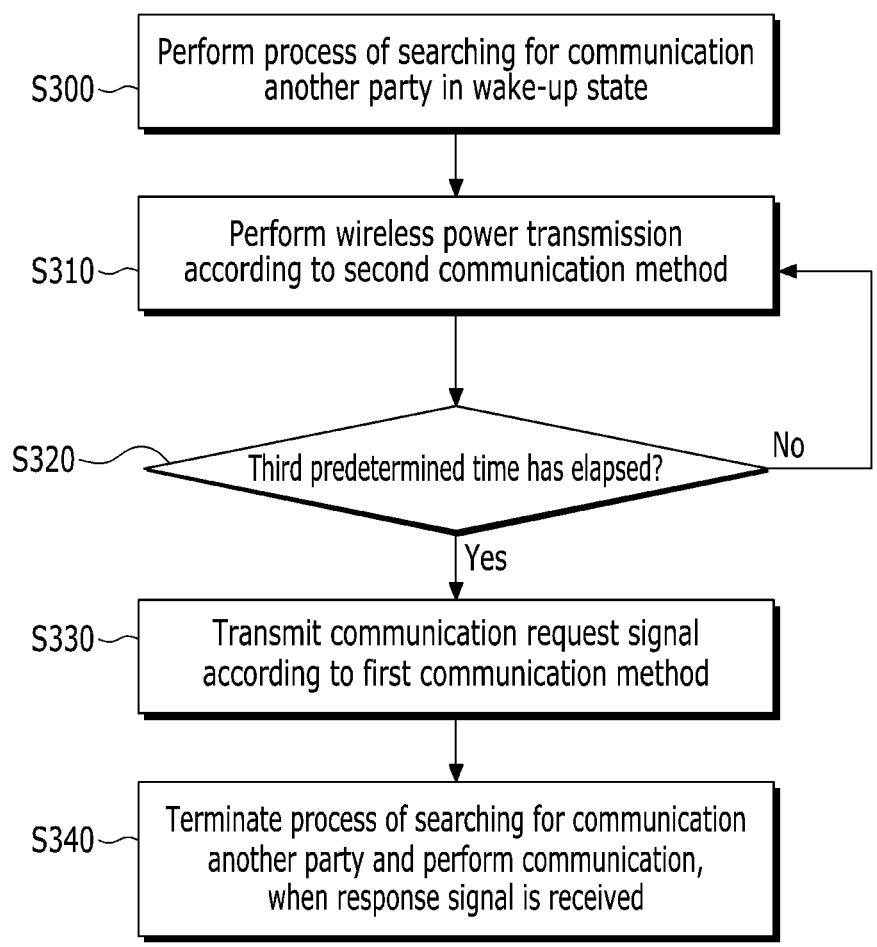
FIG. 10 is a flowchart illustrating an NFC method according to another exemplary embodiment of the present invention.

FIG. 10 is a flowchart illustrating an NFC method according to another exemplary embodiment of the present invention.

Here, while a process of searching for communication with another party according to a second communication method is first performed, and a process of searching for communication with another party according to a first communication method is performed later.

As shown in FIG. 10, the NFC reader 10 performs a process of searching for communication with another party in a wake-up state (S300).

In order to search for communication with another party, the NFC reader 10 performs a process of searching for communication with another party according to a second communication method (S310). Specifically, by operating the wireless power transmitting unit 14, the NFC reader 10 performs wireless power transmission for charging communication with another party.

Thereafter, after starting wireless power transmission, the NFC reader 10 determines whether a third predetermined time (e.g., a charge time of non-powered communication with another party) has elapsed (S320), and if a third predetermined time (e.g., a charge time of non-powered communication with another party) has elapsed, the NFC reader 10 searches for communication with another party according to a first communication method (S330). Specifically, by operating the first transmitting and receiving unit 13, the NFC reader 10 transmits a communication request signal according to microwave communication, as shown in FIG. 3. The communication request signal may be repeatedly transmitted. At this time, wireless power transmission may also be performed.

As described above, in a process of searching for communication with another party while also performing communication request signal transmission of a microwave band by the first transmitting and receiving unit 13 and/or wireless power transmission by the wireless power transmitting unit 14, when a response signal is received from the tag device 20, the NFC reader 10 terminates a process of searching for communication with another party and performs communication (S340).

According to an exemplary embodiment of the present invention, in NFC, while a wireless power transmission function and a high speed communication function by microwave cooperate, communication is performed. Therefore, while high speed transfer of a large amount of data between readers is available, communication between a reader and a non-powered tag can be performed. Further, a communication apparatus may be implemented in a structure that simultaneously has a high speed communication function and a wireless power transmission function, and when a battery, which is an internal power source, exists, consumption thereof may be reduced.

The method and apparatus according to an exemplary embodiment of the present invention can be applied to an advanced NFC.

An exemplary embodiment of the present invention may not only be embodied through the above-described device and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method in a short range communication environment, the communication method comprising:
   searching for, by a reader, via radio frequency (RF) communications without wireless power transmission, communication with another party to transmit a communication request signal;
   determining, by the reader, whether a response signal corresponding to the communication request signal is received from communication with another party within a first predetermined time;
   performing, by the reader, wireless power transmission when the response signal is not received within the first predetermined time; and
   searching for, by the reader, via RF communications, communication with another party when a second predetermined time has elapsed after the performing of wireless power transmission by the reader,
   wherein the first predetermined time is a time in which a response lapse time that is counted after a frame of the communication request signal is transmitted and a time corresponding to a frame interval are added.

2. The communication method of claim 1, wherein the second predetermined time is a charge time of a non-powered device.

3. The communication method of claim 1, wherein the searching for, via radio frequency (RF) communications without wireless power transmission, communication with another party and the determining are selectively performed according to an input through a user interface device.

4. The communication method of claim 3, wherein when the searching for, via radio frequency (RF) communications without wireless power transmission, communication with another party and the determining are skipped according to the input through a user interface device,
   the performing of wireless power transmission is directly performed when the reader is in a wake-up state.

5. The communication method of claim 1, wherein the searching for, by the reader, via RF communications, communication with another party when a second predetermined time has elapsed comprises searching for, via the RF communications, communication with another party while performing wireless power transmission when the reader does not receive a response signal from communication with another party.

6. The communication method of claim 1, further comprising:
   performing, when the reader receives a response signal from communication with another party, communication with the other party.

7. A communication apparatus configured to perform communication in a short range communication environment, the communication apparatus comprising:
   a first transmitting and receiving unit configured to search for, via radio frequency (RF) communications without wireless power transmission, communication with another party to transmit a communication request signal;
   a wireless power transmitting unit configured to perform wireless power transmission; and
   a communication controller configured to perform communication with the other party when a response signal is received from the other party through the first transmitting and receiving unit,
   wherein the wireless power transmission is performed by the wireless power transmitting unit when a response signal corresponding to the communication request signal is not received even after a first predetermined time has elapsed after a communication request signal is transmitted by the first transmitting and receiving unit, and
   communication request signal transmission by the first transmitting and receiving unit is resumed when a second predetermined time has elapsed after the wireless power transmission,
   wherein the first predetermined time is a time in which a response lapse time that is counted after a frame of the communication request signal is transmitted and a time corresponding to a frame interval are added.

8. The communication method of claim 7, wherein the second predetermined time is a charge time of a non-powered device.

9. The communication method of claim 7, wherein when a second predetermined time has elapsed after the wireless power transmission, communication request signal transmission by the first transmitting and receiving unit and the wireless power transmission by the wireless power transmitting unit are performed together.

10. The communication method of claim 7, further comprising a user interface unit,
    wherein communication request signal transmission by the first transmitting and receiving unit or wireless power transmission by the wireless power transmitting unit is performed when the communication apparatus is in a wake-up state by a signal that is input through the user interface unit.

11. The communication apparatus of claim 7, wherein the wireless power transmitting unit comprises a power transfer coil.

12. The communication apparatus of claim 7, wherein the communication apparatus performs communication in an advanced short range communication environment.

* * * * *